(No Model.)
I. B. McCORMACK.
APPARATUS FOR PURIFYING WATER.
No. 341,672.                    Patented May 11, 1886.
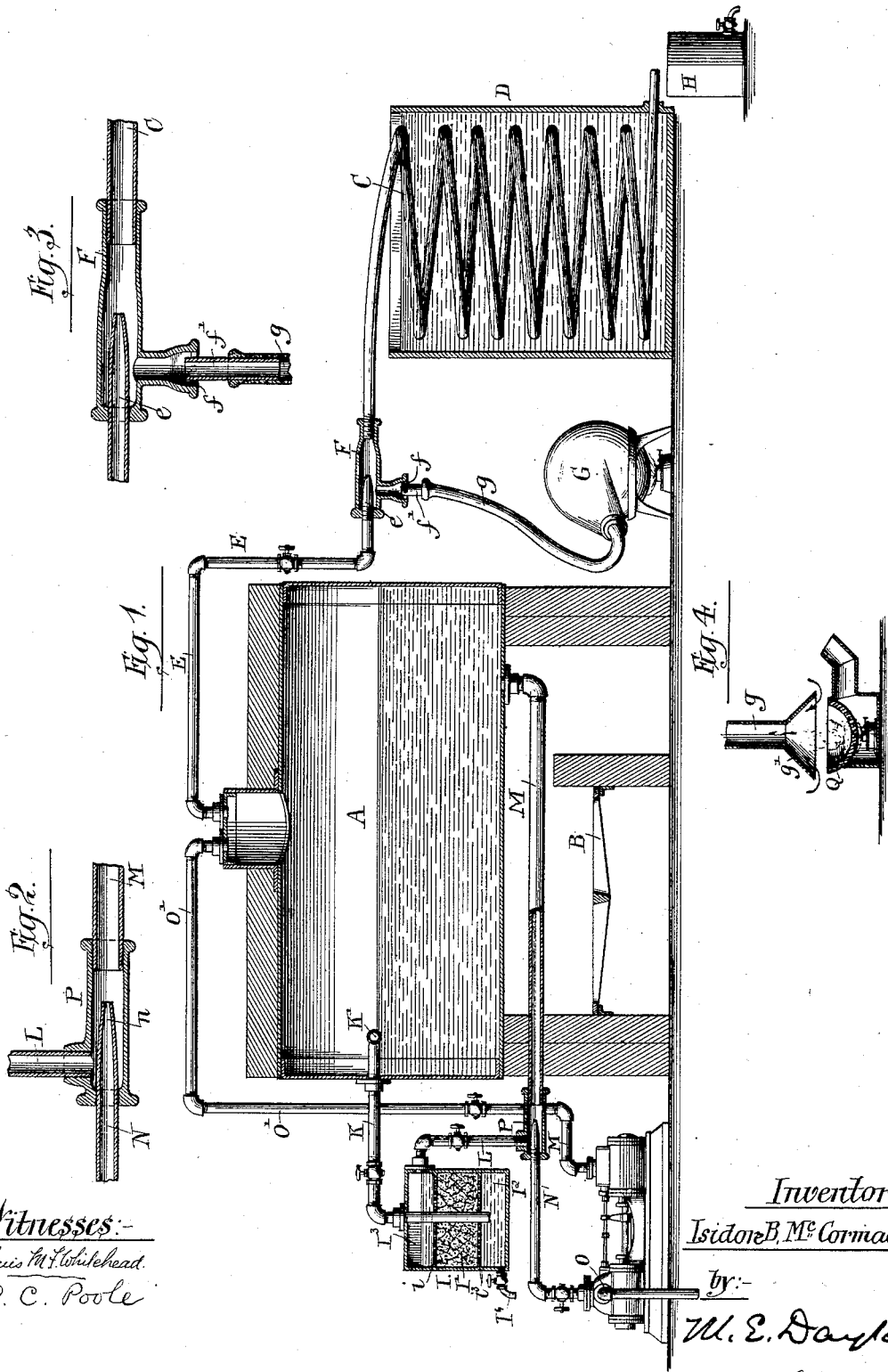
Witnesses:-
Louis M. Whitehead.
C. C. Poole
Inventor:-
Isidore B. McCormack,
by:-
M. E. Dayton
Attorney:-

UNITED STATES PATENT OFFICE.

ISIDORE B. McCORMACK, OF CHICAGO, ILLINOIS.

APPARATUS FOR PURIFYING WATER.

SPECIFICATION forming part of Letters Patent No. 341,672, dated May 11, 1886.

Application filed July 29, 1885. Serial No. 172,959. (No model.)

*To all whom it may concern:*

Be it known that I, ISIDORE B. McCOR-MACK, of Chicago, in the county of Cook and State of Illinois, have invented certain new and useful Improvements in Apparatus for Purifying Water; and I do hereby declare that the following is a full, clear, and exact description thereof, reference being had to the accompanying drawings, and to the letters of reference marked thereon, which form a part of this specification.

This invention relates to improvements in distilling apparatus adapted for purifying and medicating water; and it consists in the matters hereinafter described, and pointed out in the appended claims.

An important feature of my invention is a device embodying, in connection with a boiler or steam generator and condenser, a filter connected with the boiler for purifying the water within the latter, and feed devices for supplying the boiler, operating to produce a circulatory movement of the water through the filter.

The apparatus herein shown embraces also improved devices for aerating and medicating the distilled water, as will hereinafter fully appear.

The invention may be more fully understood by reference to the accompanying drawings, in which Figure 1 is a sectional elevation of an apparatus embodying my invention. Figs. 2, 3, and 4 are detail sectional views hereinafter described.

In the particular form of the apparatus herein illustrated as one practical embodiment of my invention, A is a boiler or steam-generator, and B is the furnace beneath the latter.

C is a condensing pipe or worm, located within a tank, D, in the usual manner.

E is a steam-pipe leading from the boiler to an injector or inspirator, F, connected with the upper end of the worm C, the said pipe E terminating in a nozzle, $e$, within the casing of the injector, which is provided with an air-inlet aperture, $f$, through which air will be drawn into the injector and carried and mixed with the steam by the action of the steam-jet from the nozzle $e$, in a well-known manner.

G is a retort or other device for generating either gas or fumes or vapor from mineral or other substances with which it may be desired to impregnate or saturate the distilled water, for the purpose of medicating the latter for baths or other purposes. The said retort is connected with the injector by means of a pipe or tube, $g$, preferably connected at its upper end with a short tube or thimble, $f'$, sustained within the air-inlet $f$ concentrically with the walls of the latter, whereby the gas or fumes passing from said tube will be carried or drawn inwardly with the air passing through the opening, and thereby mixed with the steam or water-vapor passing to the worm C.

The construction of the parts described is clearly shown in Fig. 3, which is an enlarged sectional view thereof.

By introducing the gas or vapor together with air into the worm in the manner set forth the condensed water is aerated, and the gas or vapor at the same time thoroughly and intimately combined therewith.

H represents the usual filter, by means of which the distilled and aerated water is subjected to a final purification before being used.

I is a closed filter, which is made steam-tight, but may otherwise be of any desired or preferred construction. Said filter is, as herein shown, made with two horizontal perforated partitions, $i$ $i'$, between which is placed the filtering material I', and is connected with the boiler by an inlet-pipe, K, extending through the top of the filter downwardly through the partitions $i$ $i'$ to the lower compartment, $I^2$, of the filter. The pipe K is connected within the boiler with a horizontal perforated pipe or tube, K', arranged at the level of the top of the water within the boiler, whereby the solid particles and sedimentary matter accumulating in the form of scum at the top of the water may be drawn off and will pass through the filter.

L is the exit-pipe of the filter, which is connected with the chamber $I^3$ thereof, the parts being so arranged that the water entering the lower chamber, $I^2$, through the pipe K will pass upwardly through the filtering material and be discharged through the pipe L. The said pipe L is connected with a pipe, M, which communicates with the lower part of the boiler, and through which the feed-water also enters the boiler.

N is the feed-water pipe, herein shown as connected with a steam feed-pump, O, operated by steam from a supply-pipe, O', but which may be fed by any suitably-actuated pump or by an injector. The feed-pipe N and the pipes L and M are connected with an injecting device, P, formed by a nozzle, $n$, upon the end of the feed-pipe, which is arranged to discharge into or toward the pipe M, the pipe L from the filter being connected with the injector-casing at the rear of the nozzle, so that the water-jet from the nozzle will cause a circulating movement of the water from the boiler through the filter and toward the boiler through the pipe M', as more clearly shown in the enlarged view of these parts, Fig. 2. The said pipe M is preferably extended through the furnace beneath the boiler, as shown, so that the feed-water and the water from the filter will be subjected to a high temperature before entering the boiler.

From the construction above set forth it is obvious that the pressure within the filter and the system of pipes K, L, and M will be practically uniform and equal to the pressure within the boiler, so that the feed-water entering from the nozzle $n$ under a greater pressure will cause a circulating movement through the said pipes and filter, as above set forth.

Suitable valves will be provided in the pipes K, L, and M, whereby the flow of the water to the filter and injector may be regulated as required.

The filter is desirably provided with a blow-off cock, I', at its lower part, whereby it may be cleaned of accumulated sediment by closing the valves in the pipes K and N and opening said blow-off cock, so as to allow water from the boiler to pass backwardly through the filter and out through said cock.

In purifying water by the use of distilling apparatus the accumulation of sedimentary matter in the boiler is liable to render the product impure by the carrying over with the steam or vapor of parts of such matter, and a principal object of the improved devices described is to cause the water to be filtered during the operation of the device, so that the solid matters brought to the surface by boiling will be constantly removed.

It has been proposed heretofore to employ in a sediment-collector a settling-chamber, and an injector located in a pipe leading from the boiler to the said settling-chamber and operated by the pressure of the feed-water, so as to carry water from the boiler and to discharge it, together with the said feed-water, into the settling-chamber, and an injector operated by the pressure of the feed-water for producing a circulatory movement of the water through the boiler and purifying devices is therefore not herein broadly claimed. My invention, as it relates to this feature of construction, is limited to the construction in which the induction-opening of the injector communicates with the exit-opening of a filter, as set forth in the appended claims.

Instead of connecting the retort G with the injector F by locating the upper end of the tube $g$ within the air-inlet, the said tube $g$ may be connected with the injector-casing at another point in its circumference, as illustrated, for instance, in dotted lines in Fig. 1, in which the said tube $g$ is shown as carried up and connected with the injector-casing at a point opposite the said air-inlet opening.

In some kinds of retorts or generating apparatus it may be found desirable to admit the air at the retort and draw it through the pipe $g$, together with the gas or fumes, to the injector. This construction is illustrated in Fig. 4, in which the pipe $g$ is shown as attached to a hood, $g'$, placed over a crucible, Q, from which gases, vapor, or fumes are driven off, which pass upwardly through the tube $g$, together with a supply of air, as indicated by the arrows in the drawings.

Aerating devices have heretofore been made comprising an injecting device or inspirator for carrying air into a condensing-worm with the steam; but such injecting devices have been provided with a single inlet-passage for the introduction of air or gas to the worm. By providing the injector with passages both for air and for gas or vapor, as herein shown and described, the obvious advantage is obtained that the air and gas or vapor may be together introduced into the worm as fully as above set forth.

It is to be understood that the appended claims cover the devices therein set forth when in form to obtain or perform either, any, or all of the advantages, purposes, or functions obtained by or belonging to them when in the particular form thereof illustrated.

I claim as my invention—

1. The combination, with a steam-generator and a condensing-worm, of an injector supplied from the generator and connected with the worm, and provided with an air-inlet opening, a retort or other generating apparatus, and a tube or pipe leading from the said retort and communicating with the injector, substantially as described.

2. The combination, with a steam-generator and a condensing-worm, of an injector supplied from the generator and connected with the worm and provided with an air-inlet aperture, and a tube or pipe for supplying gases, fumes, or vapors sustained with its open end within the air-opening, whereby gases, fumes, or vapors from said pipe will be carried into the worm with the air, substantially as described.

3. The combination, with a steam-generator and a condensing-worm, of an injector, F, provided with an air-inlet aperture, $f$, and a thimble, $f'$, supported concentrically within said aperture $f$, substantially as described.

4. The combination, with the boiler of a water-purifying apparatus, a filter provided with an inlet-pipe connecting with the interior of the boiler, and a feed device for the boiler supplying feed-water under a pressure greater than that within the boiler, of an injector operated by the pressure of the feed-water, and having its induction-opening connected with the exit-aperture of the filter, and a pipe or passage connecting the eduction-opening of the injector with the boiler, substantially as described.

5. The combination, with the boiler of a water-purifying apparatus and a filter, of a pipe, K, connecting the interior of the boiler at the water-line with the filter, an exit-pipe, L, an injector-pipe, P, a pipe, M, leading from the injector to the lower part of the boiler, and a feed-water pipe, N, connected with the injector-nozzle, substantially as described.

6. The combination, with the boiler and furnace of a water-purifying apparatus, of a filter having an inlet-pipe connected with the boiler at the water-line, an injector, P, a pipe, L, leading from the filter to the injector, a feed-water pipe, N, communicating with the injector-nozzle, and a pipe, M, extending from the injector through the furnace and connected with the boiler, substantially as described.

In testimony that I claim the foregoing as my invention I affix my signature in presence of two witnesses.

ISIDORE B. McCORMACK.

Witnesses:
C. CLARENCE POOLE,
G. F. LANAGHEN.